(12) United States Patent
Brody

(10) Patent No.: US 7,285,211 B2
(45) Date of Patent: Oct. 23, 2007

(54) PROCESS AND SYSTEM FOR SEPARATING SOLIDS FROM COMBINED SEWER OVERFLOWS

(75) Inventor: David Brody, Southfield, MI (US)

(73) Assignee: Hubbell, Roth & Clark, Bloomfield Hills, MI (US)

( * ) Notice: Subject to any disclaimer, the term of this patent is extended or adjusted under 35 U.S.C. 154(b) by 0 days.

(21) Appl. No.: 11/037,417

(22) Filed: Jan. 18, 2005

(65) Prior Publication Data

US 2006/0157428 A1 Jul. 20, 2006

(51) Int. Cl.
*B01D 36/04* (2006.01)

(52) U.S. Cl. .................. 210/305; 210/411; 210/521; 210/538; 210/532.1

(58) Field of Classification Search ............ 210/299, 210/305, 311, 521, 532.1, 538, 411
See application file for complete search history.

(56) References Cited

U.S. PATENT DOCUMENTS

| | | | | |
|---|---|---|---|---|
| 2,058,044 A | * | 10/1936 | Spencer | 210/538 |
| 2,799,645 A | * | 7/1957 | Musgrove | 210/521 |
| 4,400,274 A | * | 8/1983 | Protos | 210/305 |
| 4,867,877 A | * | 9/1989 | Hansen et al. | 210/305 |
| 4,929,349 A | * | 5/1990 | Beckman | 210/311 |
| 5,034,122 A | | 7/1991 | Wiesemann | |
| 5,290,454 A | | 3/1994 | Dorica et al. | |
| 5,435,664 A | | 7/1995 | Pettersson | |
| 5,543,064 A | * | 8/1996 | Batten | 210/521 |
| 5,597,477 A | | 1/1997 | Harry, III | |
| 5,658,458 A | | 8/1997 | Keyser et al. | |
| 5,672,281 A | | 9/1997 | Burns et al. | |
| 5,738,782 A | * | 4/1998 | Schafer et al. | 210/305 |
| 5,824,222 A | | 10/1998 | Keyser et al. | |
| 5,910,249 A | | 6/1999 | Kopp et al. | |
| 6,350,374 B1 | * | 2/2002 | Stever et al. | 210/532.1 |
| 6,419,094 B1 | | 7/2002 | Zittel et al. | |
| 6,475,397 B1 | | 11/2002 | Sanderson | |
| 6,503,404 B2 | | 1/2003 | Ghalib | |
| 6,773,606 B2 | | 8/2004 | Wilkins et al. | |
| 6,790,351 B2 | | 9/2004 | Xia et al. | |
| 2002/0148781 A1 | | 10/2002 | Graves | |
| 2002/0148782 A1 | | 10/2002 | Graves | |
| 2002/0153305 A1 | | 10/2002 | Graves | |
| 2002/0153306 A1 | | 10/2002 | Graves | |
| 2003/0010713 A1 | | 1/2003 | Graves | |
| 2003/0085182 A1 | | 5/2003 | Wilkins et al. | |
| 2003/0085310 A1 | | 5/2003 | Galanty et al. | |
| 2003/0089088 A1 | | 5/2003 | Mattox | |
| 2003/0121846 A1 | * | 7/2003 | Use et al. | 210/521 |
| 2004/0045907 A1 | * | 3/2004 | Collings | 210/521 |
| 2004/0159606 A1 | * | 8/2004 | Thacker et al. | 210/521 |

* cited by examiner

*Primary Examiner*—Christopher Upton
(74) *Attorney, Agent, or Firm*—Brooks Kushman P.C.

(57) ABSTRACT

A retention treatment basin system and method 10 that handles an influent of combined wastewater and sewer overflows. The influent includes floatable 12 and settlable solids 14. The basin includes a ceiling 16. The retention treatment basin has one or more influent channels 20 that duct the influent into the basin. A weir assembly 22 extends upwardly from the floor, over which the influent flows. A cell 24 receives the influent passing over the weir. At least some of the settlable solids are retained in the cell. A baffle 26 traps at least some of the floatable solids in the cell. Part of the influent passes under the baffle. One or more up-flow screen systems 28 with bars having a triangular cross-section extend from the baffle that are pervious to fluids for receiving the influent and arresting movement of floatable solids therethrough. The screen system creates a floatable-solids depleted effluent.

13 Claims, 3 Drawing Sheets

PROCESS AND SYSTEM FOR SEPARATING SOLIDS FROM COMBINED SEWER OVERFLOWS

BACKGROUND OF THE INVENTION

1. Field of the Invention

The invention relates to the processes practiced by and construction of wastewater treatment plants. More specifically, the invention relates to a system for removing solids from combined sewer overflows.

2. Background Art

Combined sewer overflows (CSOs) are discharges of wastewater from a collection system that carries sanitary and storm water. Combined sewer systems deliver the wastewater to a wastewater treatment plant (WWTP). However, melting snow or heavy, sustained rain may result in the capacity of conventional storage and ducting systems to be exceeded. Accordingly, access wastewater sometimes charge directly into surface water. In the past, this practice has been accepted in situations where it was believed that receiving waters could handle the overflow without serious damage. But, it would clearly be undesirable if sewers were to backup into streets and basements.

Combined sewer systems are frequently found in older urban communities, in which discharges from CSOs may significantly degrade water quality. It is known that CSO discharges contain pollutants found in storm water runoff as well as "sanitary" wastes. For example, storm water may transport pollutants deposited on the ground from air pollution, and sub-optimal home and business maintenance practices. Typical CSO discharges have the same pollutants as sanitary wastewater: for example, phosphorus, nitrogen, metals and bacteria, suspended solids, and other pollutants associated with storm water.

One function of a retention treatment basin is to eliminate the flow of raw sewage discharge into a receiving environment. These facilities, for example, may have a basin that is sized to provide a 30 minute retention of CSOs generated by a one year, one hour storm event. The treatment process for combined overflow involves retaining the overflow before it can reach a drain field. CSOs are designed to handle or bring sewage effluent to a treatment plant during dry weather. During wet weather infrastructure is provided to also carry storm water that enters the system. This storm water deluges the system from time to time. It does not allow pipes with an inherent-capacity constraint to deliver all effluent to the treatment plant. Further, treatment plants may not be large enough to deal with an incoming volume over a lengthy period. In such situations, effluent may overflow certain points in the system.

Accordingly, basins have been designed to retain excess effluent before it goes to a drain field. If a deluge is relatively limited in intensity or duration, a basin may retain the entire flow. The effluent receives settling, disinfection, and skimming as treatment steps before subsequent flow to the receiving water. In this way, primary treatment and disinfection produce a treated effluent that is diluted by rainwater. As a result, the treated effluent is of reasonable quality—not as high as can be produced by a treatment plant—but better than the quality of effluent reaching a receiving water under historical practices.

In some conventional retention treatment basins, a screening facility is provided. That facility arrests the flow of effluent solid material. Typically, the screened material must be mechanically raked and then lifted to ground level to be trucked out. However, such practices may violate construction restrictions that may be environmentally imposed.

Accordingly, it would be desirable to have an innovative screening system that is totally below ground and does not require mechanical raking.

Against this background, it would be desirable to have a system that works in most cases on a gravity system, rather than a pumping system with its engineering and operational consequences, such as backing up, flooding, and other adverse consequences.

Further background information is available in "COMBINED SEWER OVERFLOW TECHNOLOGY FACT SHEET," EPA—832-F-99-042 (September 1999). This fact sheet is incorporated herein by reference.

Among the art revealed by a preliminary search that preceded the filing of this application were the following U.S. references: U.S. Pat. Nos. 5,034,122; 5,290,454; 5,435,664; 5,597,477; 5,658,458; 5,672,281; 5,824,222; 5,910,249; 6,419,094; 6,475,397; 6,773,606; 6,70,351; 2002/0148781; 2002/0148782; 2002/0153305; 2002/0153306; 2003/0010713; 2003/0085182; 2003/0085310; and 2003/0089088.

Primary concerns relating to retention treatment basins in conventional CSOs are their costs and environmental impact.

SUMMARY OF THE INVENTION

The invention includes a screening system in a retention treatment basin that handles an influent of combined wastewater and sewer overflows. The influent includes floatable and settlable solids. Conventionally, the basin has a floor.

The retention treatment basin has one or more influent channels that duct the influent into the basin. Upon entry, if the volume of influent is sufficient, its surface rises to above the level of a weir that extends upwardly from the floor. The influent then flows across the weir and into a cell. At least some of the settlable solids are retained in the cell. A baffle is supported above the floor. Its primary purpose is to trap at least some of the floatable solids that are passed into the cell across the weir. Part of the influent passes under the baffle through a space defined between a lower region of the baffle and the floor.

One or more up-flow screen systems extend generally horizontally from the baffle. These screen systems are pervious to fluids. They receive the influent and arrest movement of floatable solids therethrough, thereby creating a floatable-solids depleted effluent upstream of the one or more screen systems. Preferably the one or more screen systems include a bar grating arrangement that is formed from bars that have a triangular cross-section.

In some embodiments, multiple weir assemblies, cells, and baffle assemblies are provided.

DETAILED DESCRIPTION OF THE PREFERRED EMBODIMENT(S)

Figure 1:
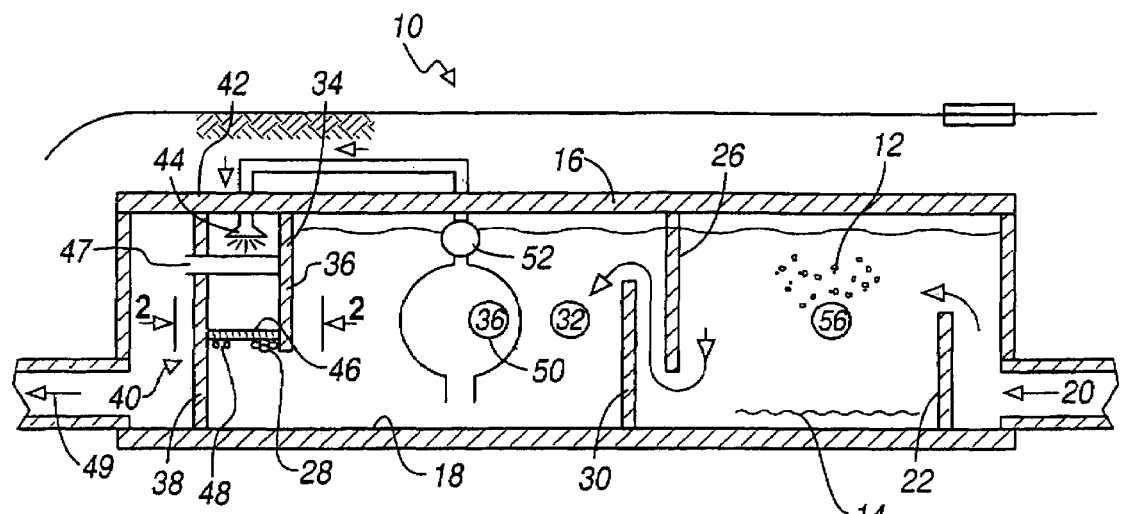
FIG. 1 is a cross-sectional view of a retention treatment basin according to the invention.

Turning first to FIG. 1, there is depicted a retention treatment basin 10 that handles an influent of combined wastewater and sewer overflows. The influent includes floatable 12 and settlable solids 14. The basin is provided with a a floor 18 and may have a ceiling 16. One or more influent channels 20 duct the influent into the basin. Upon entry, the influent confronts a weir assembly 22 that extends upwardly from the floor. The weir assembly 22 is for simplicity depicted as having a single wall. It should be realized, however, the weir assembly 22 may have a plurality of wall systems that may or may not be interconnected. Depending upon flow rate, volume, time and weir height, the level of the influent may rise above the weir assembly 22 before passage into a cell 24. At least some of the settlable solids 14 are retained in the cell 24.

The embodiment of retention basin 10 that is depicted in FIG. 1 has two cells that respectively are indicated by the reference numerals 24 and 32. In practice, there may be a single cell in a particular retention basin 10 or in fact there may be multiple cells 24, 32.

A baffle 26 is supported by the floor 18 or extends downwardly from the ceiling 16. The baffle 26 traps at least some of the floatable solids in the first cell 24, but part of the influent passes under the baffle. Some of the separable solids 14, depending upon the flow conditions, may also lie on the floor 18 of a second cell 32 in addition to those retained on the floor of the first cell 24.

Figure 4:
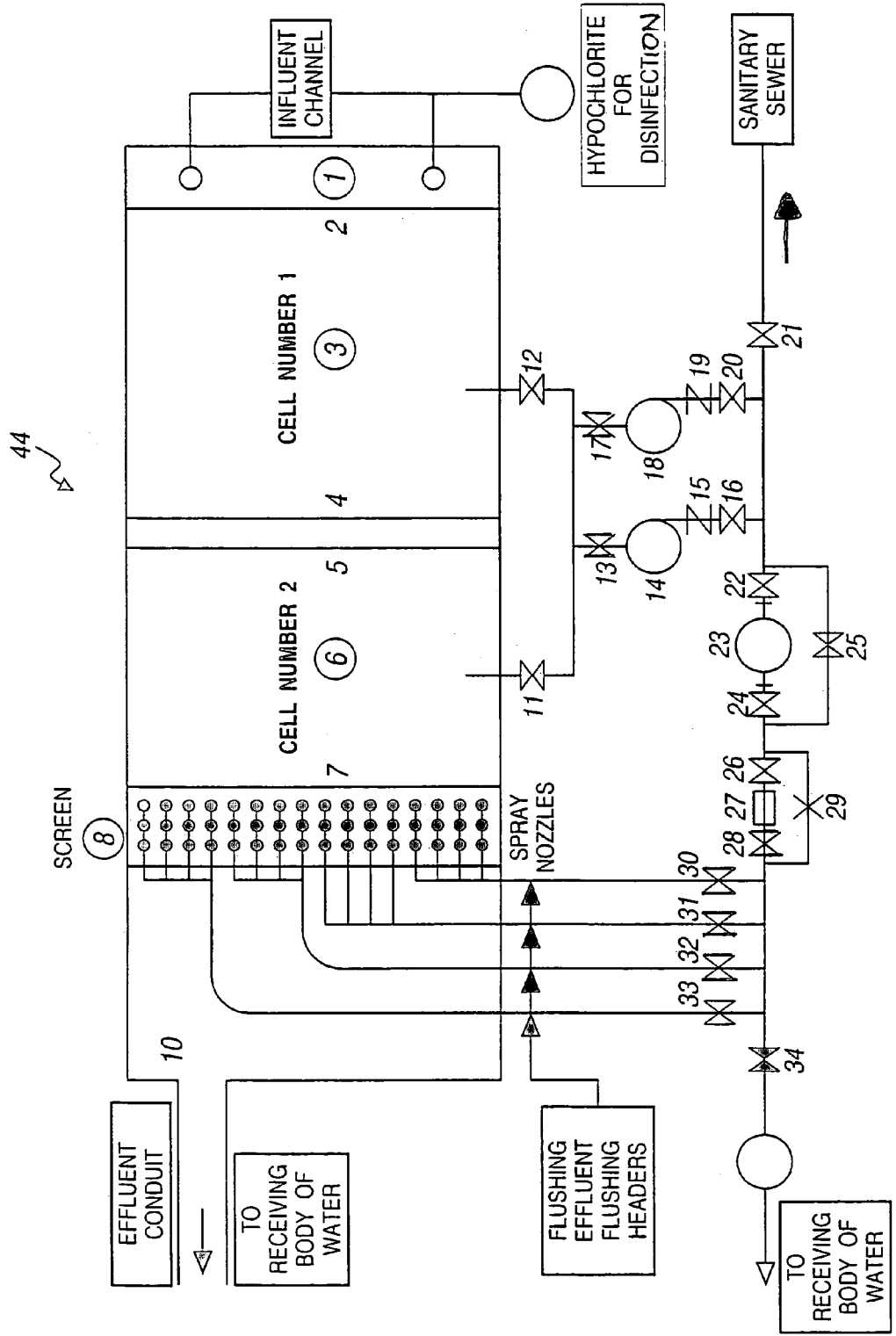
FIG. 4 is a schematic top elevation view of a retention basin illustrated with various hydraulic and electrical communications associated with downwardly directed backwash system located above the up-flow screen system.
Figure 5:
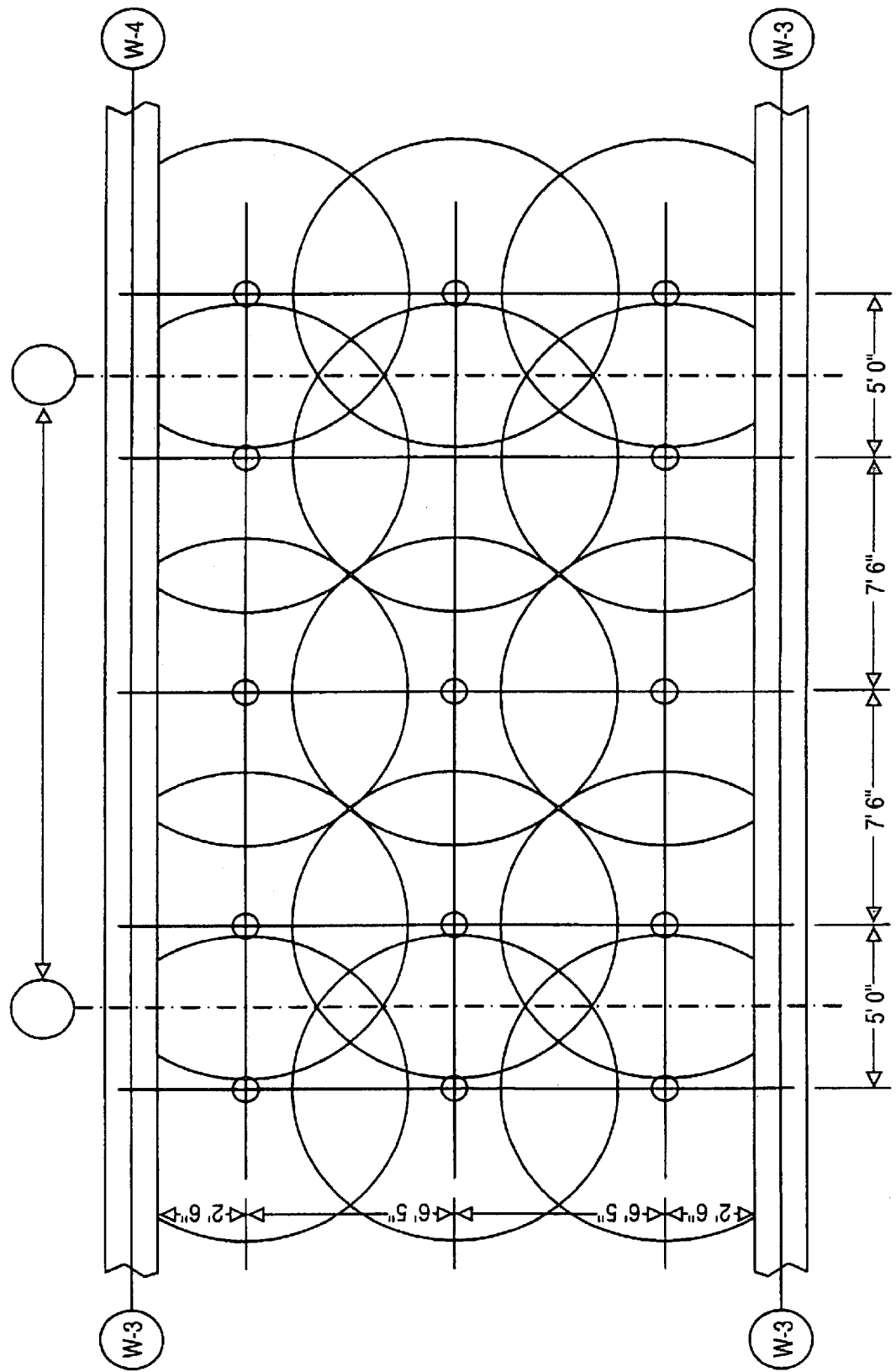
FIG. 5 is a top plan view of a spray pattern created by the downwardly directed backwash arrangement.

Depending upon the amount of influent in the second cell 32, influent may be displaced therefrom upwardly through one or more up-flow screen systems 28 that lie across an exit path from the first cell downstream of the first and second baffle assemblies 26, 36. The one or more up-flow screen systems 28 extend from one of the first or second baffle assemblies 26, 36. The up-flow screen systems 28 are at least partially blocked by solids that are trapped by fluid flow against the screen undersides 56. Otherwise, the up-flow screen systems are pervious to fluid. Accordingly, the up-flow screen systems 28 receive the influent and arrest movement of floatable solids therethrough. Part of the solids fall away under gravity into the second or first cells 32, 24 (depending upon the configuration of retention basin). A portion of the solids adhering to the underside 56 of the up-flow screening system is irrigated by a downwardly directed backwashing arrangement 44 (FIGS. 1, 4 & 5). As a result, the influent passing across the up-flow screen system comes a floatable, solids depleted effluent.

Figure 2:
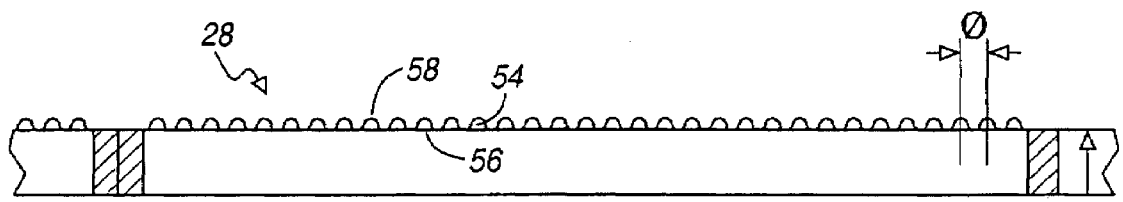
FIG. 2 is a cross-sectional view of an up-flow screen system taken along the line 2-2 of FIG. 1.
Figure 3:
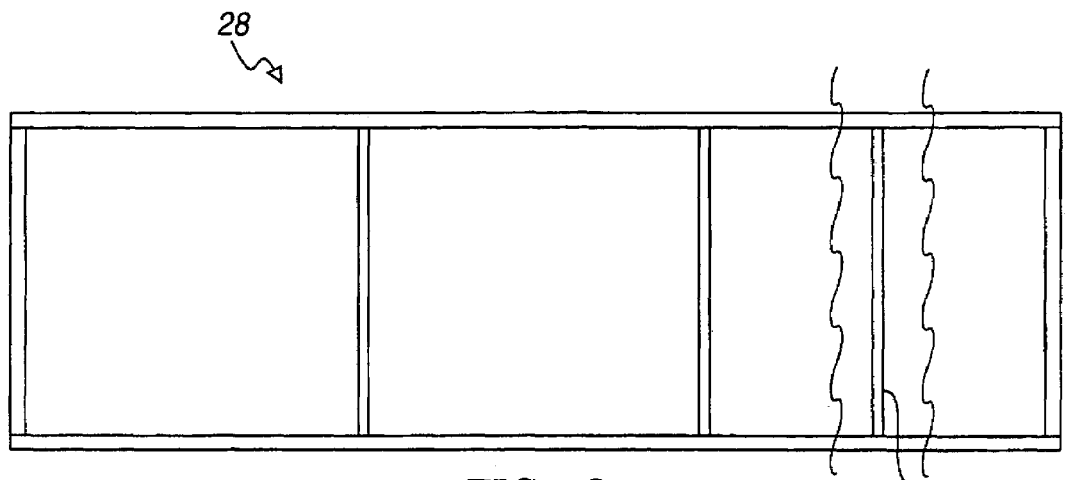
FIG. 3 is top plan view of the up-flow screen system with one bar shown.

Preferably, as shown in FIG. 1, the retention treatment basin 10 also includes a second weir assembly 30 over which the influent flows after passing below the baffle 26. In that configuration, the second cell 32 then receives the influent passing over the second weir assembly 30. At least some of the settlable solids (not shown) are retained in the second cell 32. One or more supplemental baffles 34 has a distal edge region 36. The up-flow screen system extends from the baffle in a generally horizontal orientation (FIGS. 1-3).

A wall 38 is spaced apart from the one or more supplemental baffles 36. It also supports the up-flow screen system 28 in such a way that the up-flow screen system 28 is supported by and extends between the wall 38 and the baffle 34. In the basin embodiment having a second cell 32, the up-flow screen system 28 extends between the wall 38 and the one or more supplemental baffles 34.

An effluent 40 is connected to one or more effluent troughs 47 that receive solids-depleted effluent. The effluent then flows to the receiving water via an effluent conduit 49.

In another preferred embodiment, the retention treatment basin system 10 further comprises a backwash delivery system 44 (FIGS. 4-5) that is situated above the one or more up-flow screen systems 28. The backwash delivery system 44 irrigates an upper surface 46 of the one or more up-flow screen systems by a downwardly directed flow of fluid so that solids retained by the lower surface 48 are flushed away therefrom. In such a configuration, solids are backwashed downwardly into the cell which is immediately upstream from the one or more up-flow screen systems 28.

Preferably, one or more pumps 50 (FIGS. 1, 4) are provided that are in communication with fluid residing in one of the first or second cells so that fluid accommodated by that cell is delivered therefrom to the backwash delivery system 44.

Even more preferably, a strainer 52 is provided downstream of the pumps so that particulate-depleted fluid is returned to the backwash delivery system 44 before irrigating the up-flow screen system 28 by the downward passage of irrigating fluid.

The backwash delivery system 44 irrigates the horizontally oriented up-flow screen system 28 by providing a volume of fluid that is delivered downwardly under pressure from the delivery system 44 that is situated thereabove. The flushing system utilizes water that is decanted from one of the cells, and then pumped through decant pumps 50 through a system of headers, control valves, and nozzles (FIG. 4). Preferably, the decant valves and drain valves are arranged to draw fluid from the mid-depth of the first cell 24 of the basin 10.

In an embodiment where there are two cells, before using the flushing system, the second cell 32 is drained below the elevation of the up-flow screen system 28.

Flushing system control valves are provided that are air-operated. They are plug valves and are arranged so that portions of the screen are flushed sequentially (FIG. 5). Flushing nozzles are suspended from lateral pipes so that flushing fluid is supplied uniformly through the entire up-flow screen system.

More detail will now be provided for a typical member of the one or more up-flow screen systems 28. In general, the screens are horizontally oriented. In one embodiment, they have openings (O-FIG. 2) that are located below the one or more effluent troughs 42. Effluent flow passes under the second effluent baffle 34 and then upwardly through the up-flow screen system 28.

To some extent, the screen systems 28 are self-cleaning. Debris collected on the lower surface 48 tends to fall into the adjacent cell as the basin is dewatered. After the basin is dewatered, the spray header system 44 dislodges any material that is still adhered to an up-flow screen.

The up-flow screen system 28 is flushed to basin dewatering outlets and either pumped to a drain field or removed through a bar screen that is located in a dewatering pump station wet well.

The disclosed system works in most cases on a gravity system that stands in contrast to other approaches that require some form of pumping mechanism. In practice, although one trough 47 (FIG. 1) is shown, there may be a series of multiple troughs that span many hundreds of lineal feet. When the effluent flow reaches these troughs, it may overflow the troughs and flow through another pipe into a receiving water.

One attribute of the disclosed up-flow screen system with its triangular bars is that there is very little head loss which enables the system to work under gravity without recourse to a pumping system. Very little head pressure is required to push the flow through the up-flow screen system out from the retention treatment basin. As a result, floatable material that would otherwise be offensive and unattractive remain separated from the drain field and is retained in the basin before the basin is cleansed.

Another attribute of an up-flow screen system with bars having a triangular section is an equivalent barrier to flow can be presented without significant head loss in comparison to prior art screens that are available. Observations have shown that the improvement is about 1.7:0.6, or a threefold improvement in head loss for screens that are comparably sized.

The up-flow screen system 28 is depicted in more detail in FIGS. 2-3. At least some of the up-flow screen systems comprise an assembly of bars, at least some of which having a triangular-cross section. Each section has a basal portion 56 and an apex 58. Preferably, the basal section 56 lies on the underside 48 of the one or more up-flow screen systems 28, and the apex 58 lies on an upper surface thereof. Only one bar 54 is depicted for simplicity in FIG. 3.

It will be appreciated that the embodiment depicted in FIGS. 2-3 depicts a representative bar 54 that lies laterally across one of a number frame members. For example, the embodiment of FIG. 3 depicts three horizontally disposed frame sections. It will be appreciated that the bar 54 could be arranged so that it lies parallel to the length of an up-flow screen. Preferably, the bars 54 are oriented in a generally mutually parallel relationship with an average opening (O) separating adjacent bars 54. For example, an average opening (O) may lie between 0.3 and 0.4 inches. Where an average basal section 56 is between 0.18-0.23 inches in length and there are about 35-40 bars in one of the way one or more up-flow screen systems 28.

One effect of the bars being oriented so that their apices 58 are oriented upwardly is that backwashing fluid dispensed from the overhead spray assembly 44 becomes redirected through the openings (O) upon impact with the apices 54. This effect enhances the ability of the backwashing system to irrigate away any solids that may otherwise cling to the underside 48 of the up-flow screen system 28. This obviates the need for a mechanical raking or manual step in order to separate adherent solids.

One supplier of industrial wedge wire screen is LEEM/LSS Filtration located in New Jersey. Another is Hi-Tech of Birmingham, Ala.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retention treatment basin that handles an influent of combined wastewater and sewer overflows, the influent including floatable and settlable solids, the retention basin including a floor, the retention basin having:
   one or more influent channels that duct the influent into the retention basin,
   a weir extending upwardly from the floor, over which the influent may flow;
   a cell that receives the influent passing over the weir, at least some of the settlable solids being retained in the cell;
   a screen-supporting baffle extending downwardly from the ceiling so that no influent may pass between the baffle and the ceiling, the baffle retaining at least some of the floatable solids in the cell, part of the influent passing under the baffle;
   one or more up-flow screen systems extending generally horizontally from the screen-supporting baffle and being rigidly supported thereby that are pervious to fluids, the one or more up-flow screen systems receiving the influent and arresting movement of floatable solids therethrough, thereby creating a floatable-solids depleted effluent; and
   a backwash delivery system situated above the one or more up-flow screen systems, the backwash delivery system irrigating an upper surface of the one or more up-flow screen systems by a downwardly directed flow of fluid so that solids retained by a lower surface of the one or more screen systems are flushed away therefrom.

2. The retention treatment basin of claim 1, further comprising:
   one or more supplemental weirs extending upwardly from the floor, over which the influent flows after passing below an upstream baffle;
   one or more supplemental cells that receive the influent passing over the one or more supplemental weirs, at least some of the settlable solids being retained in the one or more supplemental cells; and
   one or more supplemental upstream baffles that are positioned upstream of the screen-supporting baffle and extend downwardly from the ceiling.

3. The retention treatment basin of claim 2, further comprising:
   a wall that is spaced apart from the screen-supporting baffle and supports the one or more up-flow screen systems so that the one or more up-flow screen systems extend between the wall and the screen-supporting baffle.

4. The retention treatment basin of claim 1, further comprising:
   a plurality of effluent channels connected to one or more effluent troughs that receive solids-depleted effluent.

5. The retention treatment basin of claim 1, wherein the solids retained at least partially by the lower surface of the one or more screen systems are backwashed downwardly into the cell.

6. The retention treatment basin of claim 1, wherein the one or more up-flow screen systems comprise an assembly of bars, at least some of which having a triangular cross-section, each cross-section having a basal portion and an apex.

7. The retention treatment basin of claim 6, wherein the basal section of a bar lies on the underside of the one or more up-flow screen systems and the apex lies on an upper surface thereof.

8. The retention treatment basin of claim 7, wherein the bars are oriented in a generally mutually parallel relationship with an average opening (O) separating adjacent bars.

9. The retention treatment basin of claim 8, wherein the average opening (O) is between 0.3 and 0.4 inches and the average basal section is between 0.18 -0.23 inches in length, there being provided a number of bars between 35 and 40 in one of the one or more up-flow screen systems.

10. The retention basin of claim 1, wherein at least one of the one or more up-flow screen systems includes a frame having multiple horizontally disposed sections for supporting bars that traverse thereacross.

11. A retention treatment basin that handles an influent of combined wastewater and sewer overflows, the influent including floatable and settlable solids, the retention basin including a floor, the retention basin having:
- one or more influent channels that duct the influent into the retention basin;
- a weir extending upwardly from the floor, over which the influent may flow;
- a cell that receives the influent passing over the weir, at least some of the settlable solids being retained in the cell;
- a baffle extending downwardly from the ceiling, the baffle retaining at least some of the floatable solids in the cell, part of the influent passing under the baffle;
- one or more up-flow screen systems extending generally horizontally from the baffle that are pervious to fluids, the one or more up-flow screen systems receiving the influent and arresting movement of floatable solids therethrough, the screen system thereby creating a floatable-solids depleted effluent; and
- a pump in communication with fluid residing in a cell so that fluid accommodated by the cell is delivered therefrom to a backwash delivery, the backwash delivery system being situated above the one or more up-flow screen systems, the backwash delivery system irrigating an upper surface of the one or more up-flow screen systems by a downwardly directed, pressurized flow of fluid so that solids retained by a lower surface are flushed away therefrom.

12. The retention treatment basin of claim 11, further comprising a strainer through which fluid returned to the backwash delivery system passes before irrigating the one or more up-flow screen systems.

13. A method for separating solids in a retention treatment basin that handles an influent of combined wastewater and sewer overflow, the influent including floatable and settlable solids, the process comprising the steps of:
- directing the influent into the retention basin;
- directing the influent across a weir assembly in the basin into a cell that receives the influent passing over the weir assembly so that at least some of the settlable solids are retained in the cell;
- allowing the influent to flow under a baffle assembly, the baffle assembly retaining at least some of the floatable solids in the cell; and
- providing one or more up-flow, rigidly supported screen systems that extend generally horizontally from the baffle assembly and that before being partially blocked by the presence of solids upon its underside are pervious to fluids, the up-flow screen system receiving the influent and arresting movement of floatable solids therethrough, part of the solids falling away under gravity into the cell and a portion of the solids adhering to the underside of the up-flow screen system being irrigated by a downwardly directed backwashing arrangement, the up-flow screen system thereby forming an effluent that is depleted of floatable solids.

* * * * *